(No Model.)
S. W. TELFORD.
NUT LOCK.
No. 601,688. Patented Apr. 5, 1898.
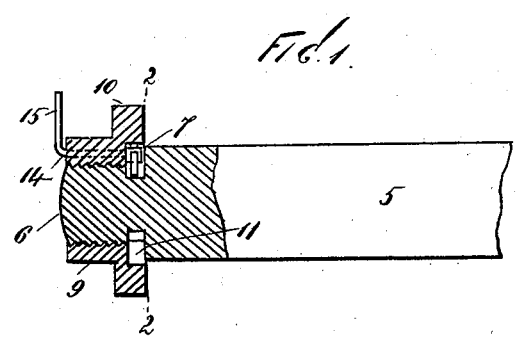
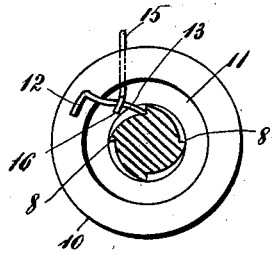   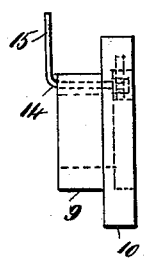
WITNESSES:  INVENTOR
  Samuel W. Telford.
  BY
  Edgar Tate & Co
  ATTORNEYS.

UNITED STATES PATENT OFFICE.

SAMUEL WORTH TELFORD, OF LITTLE ROCK, ARKANSAS.

NUT-LOCK.

SPECIFICATION forming part of Letters Patent No. 601,688, dated April 5, 1898.

Application filed March 1, 1897. Serial No. 625,653. (No model.)

*To all whom it may concern:*

Be it known that I, SAMUEL WORTH TELFORD, a citizen of the United States, residing at Little Rock, in the county of Pulaski and State of Arkansas, have invented certain new and useful Improvements in Nut-Locks, of which the following is a full and complete specification, such as will enable those skilled in the art to which it appertains to make and use the same.

This invention relates to nut-locks, and particularly to devices of this class which are adapted for use on the spindles of carriages and other vehicles; and the object of the invention is to provide an improved device of this class which is simple in construction and operation and which is also comparatively inexpensive.

The invention is fully disclosed in the following specification, of which the accompanying drawings form a part, in which—

Figure 1 is a sectional side view of the end of a carriage-spindle provided with my improvement; Fig. 2, a section thereof on the line 2 2, and Fig. 3 a side view of the nut detached.

In the drawings forming part of this specification the separate parts of my improvement are designated by the same numerals of reference in each of the views, and in said drawings I have shown at 5 the end of a carriage-spindle which is provided with a screw-threaded extension 6, and at the inner end of said extension or adjacent to the annular shoulder 7, formed thereby, are a plurality of ratchet-teeth or projections 8, four of which are shown in Fig. 2, but any desired number of which may be employed. I also provide a nut 9, which is provided with an annular flange or rim 10 at the inner end thereof, and formed in said annular rim or flange adjacent to the central bore of said nut is an annular groove 11.

The annular flange or rim 10 is provided with an angular cavity or recess 12, in which is placed a spring 13, the free end of which operates in connection with the ratchet-teeth or projections 8, and formed in one side of the nut 9 is a longitudinal bore or passage 14, through which in practice is passed one end of an angular arm or rod 15, the inner end of which is provided with an eye or loop 16, through which the free end of the spring 13 is passed.

The normal position of the spring 13 is that shown in Fig. 2 when the nut 9 is in position on the spindle, and the nut may be screwed onto the spindle, as will be readily understood, and the spring 13 will engage with one of the teeth or projections 8 and lock the nut upon the spindle.

In order to remove the nut, it is only necessary to turn the arm 15 downwardly, and this operation will disengage the spring 13 from the tooth or projection 8 with which it is engaged, and said nut may be easily removed, as will be readily understood.

This device is simple in construction and operation and comparatively inexpensive and is well adapted to produce the result for which it is intended.

Having fully described my invention, I claim as new and desire to secure by Letters Patent—

The herein-described nut-lock comprising the combination with a bolt having a screw-threaded extension and an annular groove at the base of said extension in which is formed a plurality of ratchet-teeth of a nut mounted on said screw-threaded extension, a pawl mounted in a chamber at the inner end of said nut and adapted to engage the ratchet-teeth formed in said groove and a lever mounted in a longitudinal bore or passage in said nut and provided at the outer end with an angular extension and at the inner end with a loop through which said pawl passes, substantially as and for the purpose described.

In testimony that I claim the foregoing as my invention I have signed my name, in presence of the subscribing witnesses, this 23d day of February, 1897.

SAMUEL WORTH TELFORD.

Witnesses:
J. MENKUS,
ISAAC EMMICH.